(12) United States Patent
Garg et al.

(10) Patent No.: US 6,862,630 B1
(45) Date of Patent: Mar. 1, 2005

(54) NETWORK TRANSMITTER WITH DATA FRAME PRIORITY MANAGEMENT FOR DATA TRANSMISSION

(75) Inventors: Atul Garg, San Jose, CA (US); Yatin Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 819 days.

(21) Appl. No.: 09/644,464

(22) Filed: Aug. 23, 2000

(51) Int. Cl.[7] ............................. G06F 3/00; G06F 7/20; G06F 5/06
(52) U.S. Cl. .......................... 709/250; 370/235; 710/54
(58) Field of Search ................................ 709/250, 237, 709/234; 370/235, 474, 315; 710/54

(56) References Cited

U.S. PATENT DOCUMENTS

| | | | | |
|---|---|---|---|---|
| 4,719,620 A | * | 1/1988 | Machino et al. ............. 370/445 |
| 4,914,650 A | * | 4/1990 | Sriram .......................... 370/235 |
| 5,043,981 A | * | 8/1991 | Firoozmand et al. ........ 370/235 |
| 5,077,655 A | * | 12/1991 | Jinzaki ......................... 709/237 |
| 5,381,413 A | | 1/1995 | Tobagi et al. |
| 5,434,976 A | * | 7/1995 | Tan et al. ..................... 709/234 |
| 5,448,564 A | * | 9/1995 | Thor ............................. 370/392 |
| 5,671,355 A | * | 9/1997 | Collins ......................... 709/250 |
| 5,926,458 A | | 7/1999 | Yin |
| 6,097,734 A | * | 8/2000 | Gotesman et al. ........... 370/474 |
| 6,157,623 A | * | 12/2000 | Kerstein ....................... 370/315 |
| 6,393,457 B1 | * | 5/2002 | Allison et al. ............... 709/201 |
| 6,442,631 B1 | * | 8/2002 | Neufeld et al. .............. 710/107 |

OTHER PUBLICATIONS

Tics Realtime Definitions Tics Realtime, 1584 Camden Village Circle, San Jose California 95124. Copyright Tics Realtime, 1996.*
Hluchy et al.; "Performance Analysis of a Preemptive Priority Queue with Applications to Packet Communication Systems;" Dec. 1983 pp. 3225–3244.
International Search Report regarding Application No. PCT/US01/21440 dated Feb. 27, 2002.

* cited by examiner

Primary Examiner—Dung C. Dinh
Assistant Examiner—Chad Zhong
(74) Attorney, Agent, or Firm—Renner, Otto, Boisselle & Sklar, LLP

(57) ABSTRACT

A transmission circuit for transmitting data of varying priorities on a network medium is provided. The transmission circuit includes sub-circuits to receive and store data frames into random access memory frame buffers and priority tables. Sub-circuit priority resolution selects the highest priority frame, and sub-circuit frame transmission transmits the frame to a media access controller to be made available by the network medium.

20 Claims, 5 Drawing Sheets

NETWORK TRANSMITTER WITH DATA FRAME PRIORITY MANAGEMENT FOR DATA TRANSMISSION

TECHNICAL FIELD

The present invention relates generally to network interfacing, and more particularly, to an apparatus and method for prioritizing data frames for transmission on a network medium.

BACKGROUND OF THE INVENTION

As computer engineering and digital signal processing technology has advanced, there has been an increasing demand for cost-efficient transmission of digital information through communication networks. To meet this demand, high-speed packet-switched communication networks have been developed. The packet-switched communication network typically multiplexes different information sources into a single communication channel to maximize bandwidth utilization. For example, in a packet-switched network, computer data files, digitized voice data, and other data content are coded into transmission frames. Each data frame transmission is then transmitted to a remote device on a network medium when the channel is available.

A problem with such networks is that during peak transmission periods, the network can become congested. When the network is congested, data frames are held in queues of transmitters and switching nodes, causing delays in delivery of data frames. Traditionally, data frames are transmitted in the order they are received, first-in-first-out (FIFO), irrespective of a data frame's priority.

When data frames containing computer data files or other computer data content are delayed, the delay may be noticeable and annoying to a user waiting for a file or a web page to load. However, when the file arrives, it is just as useful and provides the same information content to the computer or the user as if it had arrived in a faster time. This can be referred to as non-time sensitive data or non-real time data, i.e., lower priority data frames.

On the other hand, data frames that contain digitized voice data representing voice communication, such a telephone call between two operators, are time sensitive or real time data, i.e., higher priority data frames. When speech is digitized, segmented, and compressed into speech frames, each data frame must arrive at the receiver within a fixed time window for the receiver to decompress and reconstruct to an analog audio signal. Network delay of time sensitive packets, such as digitized voice data, will result a broken audio signal at the receiver and/or completely unintelligible sound bursts. In either case, time sensitive data, unlike non-time sensitive data, is useless if it does not arrive on time because of congested networks. While digital audio data and digital video data are obvious examples of time sensitive data, other types of data in any transaction processing system can have varying priority requirements for network resources.

One solution to relieve network congestion and to ensure timely delivery of all data frames regardless of time sensitivity or priority is simply to increase overall network bandwidth by increasing the data rate and/or adding additional transmission lines and/or routers. However, such solution can be costly, and the additional resources are not needed during periods the network is not congested.

Another solution to ensure timely deliver of time sensitive data frames is to prioritize data frames within the queue. However, prioritizing frames within a queue does not resolve a front of line blocking problem. A front of line blocking problem occurs when, for example, the highest priority data frame (say priority 3) is retrieved from a queue and is written to a register (or other memory) for transmission in the next available time slot (e.g. interval of time available to the media access controller for transmission). At this time, that data frame is isolated from the remaining data frames left in the queue. The remaining data frames in the queue may be reprioritized with newer, incoming data frames, however, no other frames can be transmitted until that first data frame is transmitted. Hence, a higher priority data frame (say 6) which has come into the queue after the first frame was written to the register is blocked from transmitting before the lower priority data frame 3.

What is needed is a transmitter system and a method that provides for higher priority frames to be prioritized over lower priority frames which does not suffer the front of line blocking problems associated with known prioritization systems.

SUMMARY OF THE INVENTION

A first aspect of the present invention is to provide a frame processing unit for transmitting data frames of varying priorities on a network medium. The frame processing unit comprises: a) a frame buffer management circuit receiving data frames and storing data frames in a buffer memory; b) a register storing data representing the existence of data frames of a designated priority in the buffer memory; c) a priority resolution circuit, reading the register to determine the highest priority data frame available for transmission; and d) a frame transmission circuit receiving an address of the highest priority data frame from the priority resolution circuit, receiving a signal from a media access controller indicating that a frame may be transmitted, retrieving a frame from the buffer memory corresponding to the address, and making the data frame available to the media access controller for transmitting to the network medium.

Further, the priority resolution circuit may continually retrieve data from the register to determine the highest priority data frame in the buffer memory and replace an address previously provided to the frame transmission circuit if a higher priority frame becomes available.

The frame buffer may be a random access memory frame buffer and the processing unit may further include a random access memory pointer table storing an indicator of the priority for each frame in the frame buffer along with the address location of each frame in the fame buffer. The frame buffer management circuit may locate the address of the highest priority frame, as indicated by the register, from looking up the priority in the random access memory pointer table.

In one embodiment, the media access controller receives the frame from the frame transmission circuit and makes each frame available to physical layer circuitry. Thereafter, the frame transmission circuit may send a command to the priority resolution circuit which in turn updates the register and the random access memory pointer table to reflect transmission of the frame.

The frame buffer management circuit may receive and store data frames from an application via a peripheral bus and the data received via the peripheral bus may include data of varying priorities as assigned by the application.

A second aspect of the present invention is to provide a method of transmitting the highest priority data frame available in a frame buffer. The method comprises: a) reading data from a register to determine the priority of the highest priority data frame available for transmission; b) locating a frame buffer address at which the highest priority frame is stored in a frame buffer; c) writing the address of the highest priority data frame to a frame transmission circuit; d) overwriting the address of the highest priority data frame with the address of a new highest priority data frame if a new higher yet priority data frame becomes available; and e) retrieving the new highest priority data frame from the frame buffer and transmitting the new highest priority data frame when the network media is available.

The step of locating the frame buffer address may include looking up the frame buffer address in a pointer table which stores the frame buffer address along with the priority of the frame stored at the address. Further, the method may further include updating the register and updating the pointer table upon transmission of a data frame to reflect transmission of the data frame.

A third aspect of the present invention is to provide a network computer comprising a central processing unit operating a plurality of applications generating data frames of varying priorities for transmission on a network medium. The network computer includes a network interface circuit receiving the data frames from the central processing unit and transmitting the data frames on the network medium in priority order. The network interface circuit includes: a) a frame buffer management circuit receiving data frames from the central processing unit and storing data frames in a buffer memory; b) a register storing data representing the existence of data frames of a designated priority in the buffer memory; c) a priority resolution circuit, reading the register to determine the highest priority data frame available for transmission; and d) frame transmission circuit receiving an address of the highest priority data frame from the priority resolution circuit, receiving a signal from a media access controller indicating that a frame may be transmitted, retrieving a frame from the buffer memory corresponding to the address, and making the data frame available to the media access controller for transmitting to the network medium.

Further, the priority resolution circuit may continually retrieve data from the register to determine the highest priority data frame in the buffer memory and replace an address previously provided to the frame transmission circuit if a higher priority frame becomes available.

The frame buffer may be a random access memory frame buffer and the processing unit may further include a random access memory pointer table storing an indicator of the priority for each frame in the frame buffer along with the address location of each frame in the fame buffer. The frame buffer management circuit may locate the address of the highest priority frame, as indicated by the register, from looking up the priority in the random access memory pointer table.

In one embodiment, the media access controller receives the frame from the frame transmission circuit and makes each frame available to physical layer circuitry. Thereafter, the frame transmission circuit may send a command to the priority resolution circuit which in turn updates the register and the random access memory pointer table to reflect transmission of the frame.

The frame buffer management circuit may receive and store data frames from an application via a peripheral bus and the data received via the peripheral bus may include data of varying priorities as assigned by the application.

DESCRIPTION OF THE PREFERRED EMBODIMENTS

Figure 1:
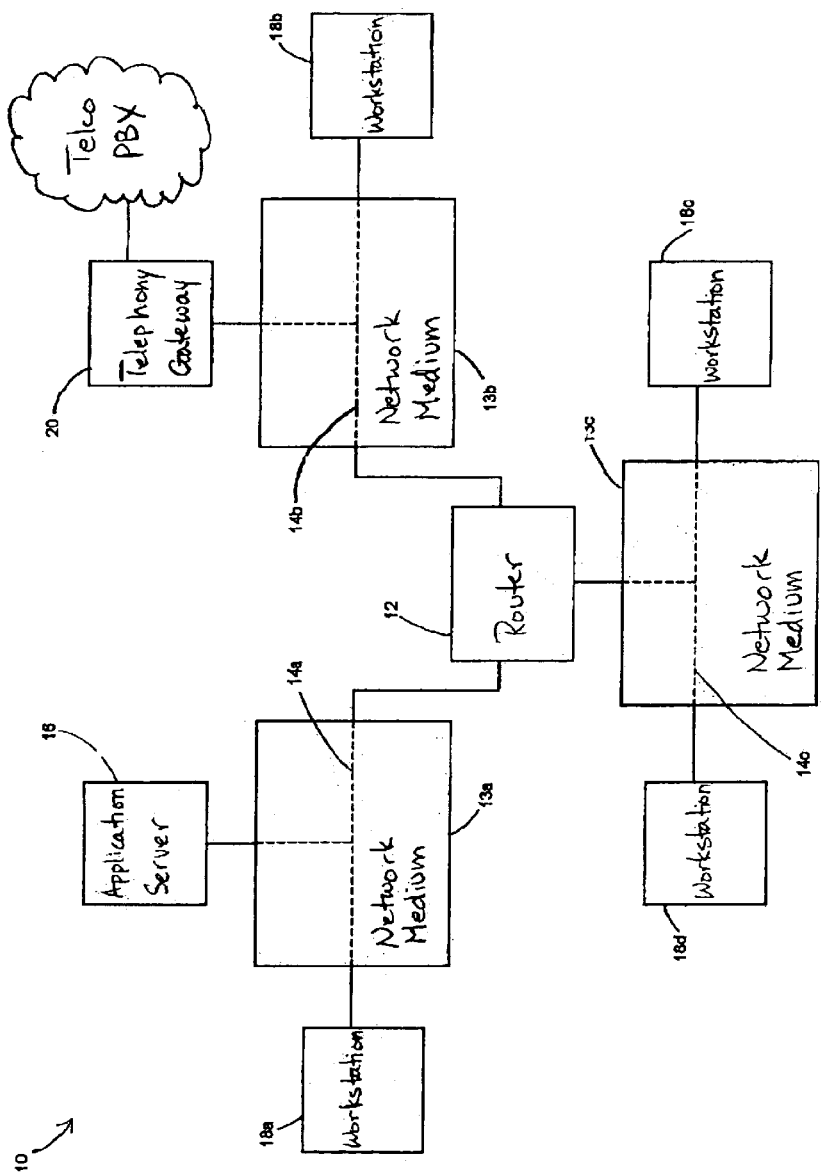
FIG. 1 is a block diagram of a network in accordance with one embodiment of this invention.

The present invention will now be described in detail with reference to the drawings. In the drawings, like reference numerals are used to refer to like elements throughout.

Referring to FIG. 1, a network 10 is shown in accordance with one embodiment of this invention. Network 10 includes a router 12 interconnecting three sub networks 13(a)–13(c), each including a physical medium 14(a)–14(c) interconnecting devices coupled to each of the sub networks 13(a)–13(c). Typically, each physical medium 14(a)–14(c) interconnects each device coupled to the physical medium 14(a)–14(c) and all such devices communicate data frames with other devices coupled to the physical medium 14(a)–14(c) using a defined network protocol. For example, network 14(a) may include a physical medium and protocol as set forth in one of the known Ethernet standards. It should be appreciated that the physical medium 14(a)–14(c) may span a large coverage area and may include a wide area network physical medium and communicate utilizing a wide area network protocol. It should be appreciated that the specific network physical medium and protocol are not intended to limit the scope of this invention and it is contemplated that network 10 may include sub-networks 13(a)–13(c) which utilize full-duplex networks and/or wireless networks.

Coupled to network 10 is a plurality of client workstations 18(a)–18(d) which, in the preferred embodiment, are typical desktop computers. Each client workstation 18 includes appropriate hardware and software for communicating over a data network. For example, each workstation 18 may be HPNA 2.0 enabled and the network medium 14 may be a POTS twisted pair telephone network. HPNA 2.0 is a protocol for transferring data over POTS twisted pair telephone wiring that is promulgated by the Home Phone line Networking Association which is an industry consortium including Advanced Micro Devices of Sunnyvale Calif. Further, each client workstation 18 operates a data processing application which interfaces with an application server 16 via the network 10. Additionally, each client workstation 18 is H.323 enabled for enabling the operator to carry on full duplex audio communications (e.g. telephone calls) with other operators of workstations 18 and other people using the data network 10 via an H.323 telephony gateway 20. H.323 is an Internet protocol (IP) telephony standard promulgated by the International Telephony Union (ITU).

Application server 16 is a typical application server storing and communicating files with each of the client workstations 18. Telephony gateway 20 functions to interconnect digitized audio data frames (e.g. frames of digitized audio data representing telephone calls) between multiple client workstations 18 and/or standard telephones coupled to a PBX system or a local telephone company subscriber loop.

Figure 2:
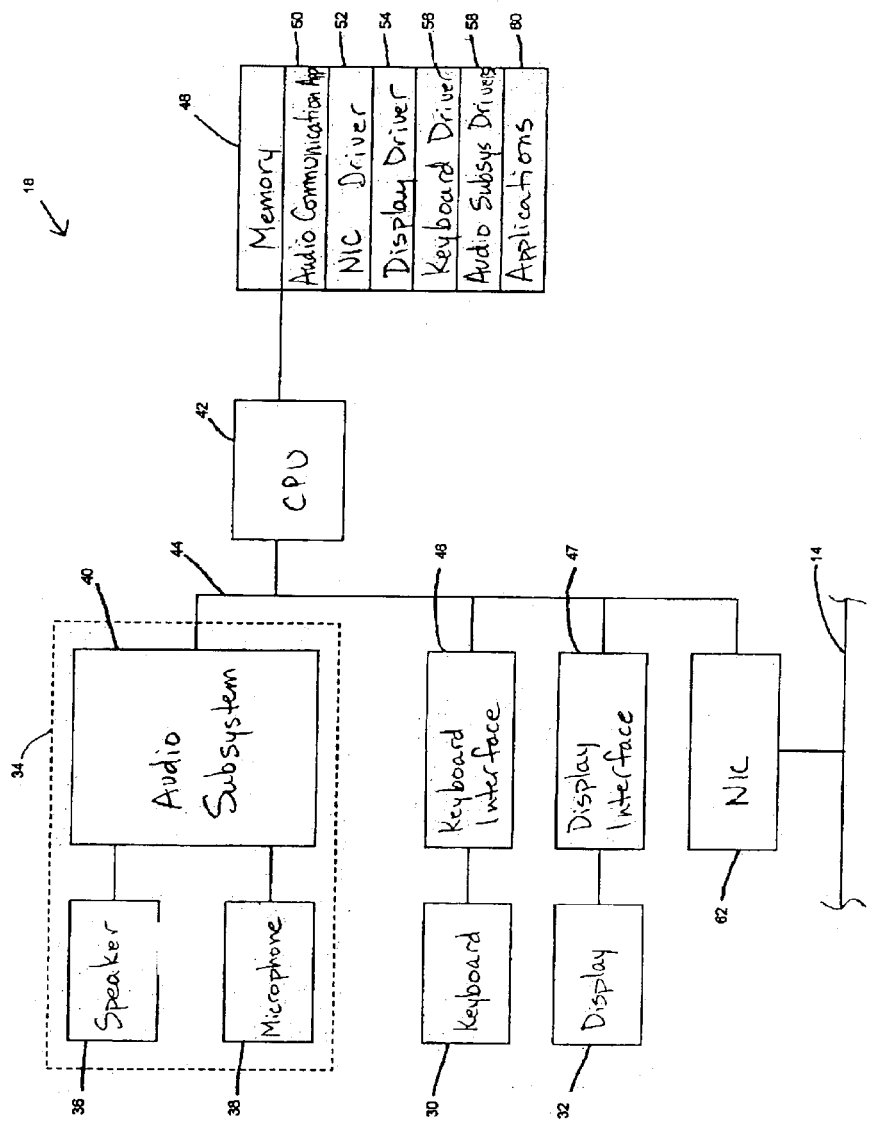
FIG. 2 is a block diagram of a client workstation in accordance with one embodiment of this invention.

Referring to FIG. 2, a block diagram of workstation 18 is shown. Workstation 18 includes a processor 42 and a memory 48 for storing and executing the data processing application 60, audio communication application 50, and any other code needed to drive the various peripheral hardware circuits associated with workstation 18 as discussed herein.

The client workstation 18 includes a typical keyboard 30 and display 32 through which an operator interfaces with the data processing application 60. The keyboard 30 is coupled to keyboard interface circuitry 46, which in turn couples to the processor 42 via peripheral bus 44. A keyboard driver 56 stored in memory 48 drives keyboard 30 using known techniques. Similarly, display 32 is coupled to display interface circuitry 47, such as a video card, which in turn couples to processor 42 via peripheral bus 44. A display driver 54 stored in memory 48 drives the display interface circuitry 47 and display 32.

A LAN telephony system 34 enables the workstation operator to initiate and receive telephone calls via the H.323 telephony gateway 20 (FIG. 1). LAN telephony system 34 includes a speaker 36, a microphone 38, and an audio subsystem 40. Audio subsystem 40 couples to the processor 42 via peripheral bus 44. An audio subsystem driver 58 stored in memory 48 operates the audio subsystem 40, speaker 36, and microphone 38 for audio interface with the operator. An audio communication application 50 functions to encode/decode frames of digital audio data in accordance with the H.323 standard as well as exchange such digital audio data frames with telephony gateway 20 (FIG. 1). The audio communication application 50 also enables the operator to use the keyboard 30 and display 32 as an interface for dialing or otherwise initiating a telephone call.

Client workstation 18 is coupled to the network medium 14 (i.e., 14(a), 14(b) or 14(c)) through a network interface card 62. The network interface card 62 is coupled to the processor 42 via peripheral bus 44 and a network interface driver 52 stored in memory 48 and executed by the processor 42 drives the network interface card 62.

It should be appreciated that network interface card 62 functions to communicate frames of digital audio data with telephony gateway 20 and frames of data processing application data with application server 16. As discussed above, when the network 10 or any of the sub networks 13 become congested, delivery of frames may be delayed. Further, delivery of frame to the telephone gateway 20 and to the application server 16 may be delayed due to heavy loading on the gateway 20 or the application server 16 (e.g. other workstations 18 trying to send frames simultaneously). While delay of frames containing data processing application data may be noticeable and annoying to a user waiting for a file or web page to load, the delays do not destroy the usefulness of the data. However, delays of digitized audio data representing voice communication or real time video data can result in a broken audio signal at the receiver and/or completely unintelligible sound bursts or the disruption of the video images. Thus, data frames of varying priorities containing digitized audio data or real time video data can be referred to as real time frames, i.e., data frames which have been assigned higher priorities by an application. Data frames of varying priorities containing data processing application data can be referred to as non-real time frames, i.e., data frames which have been assigned lower priorities by an application.

Figure 3:
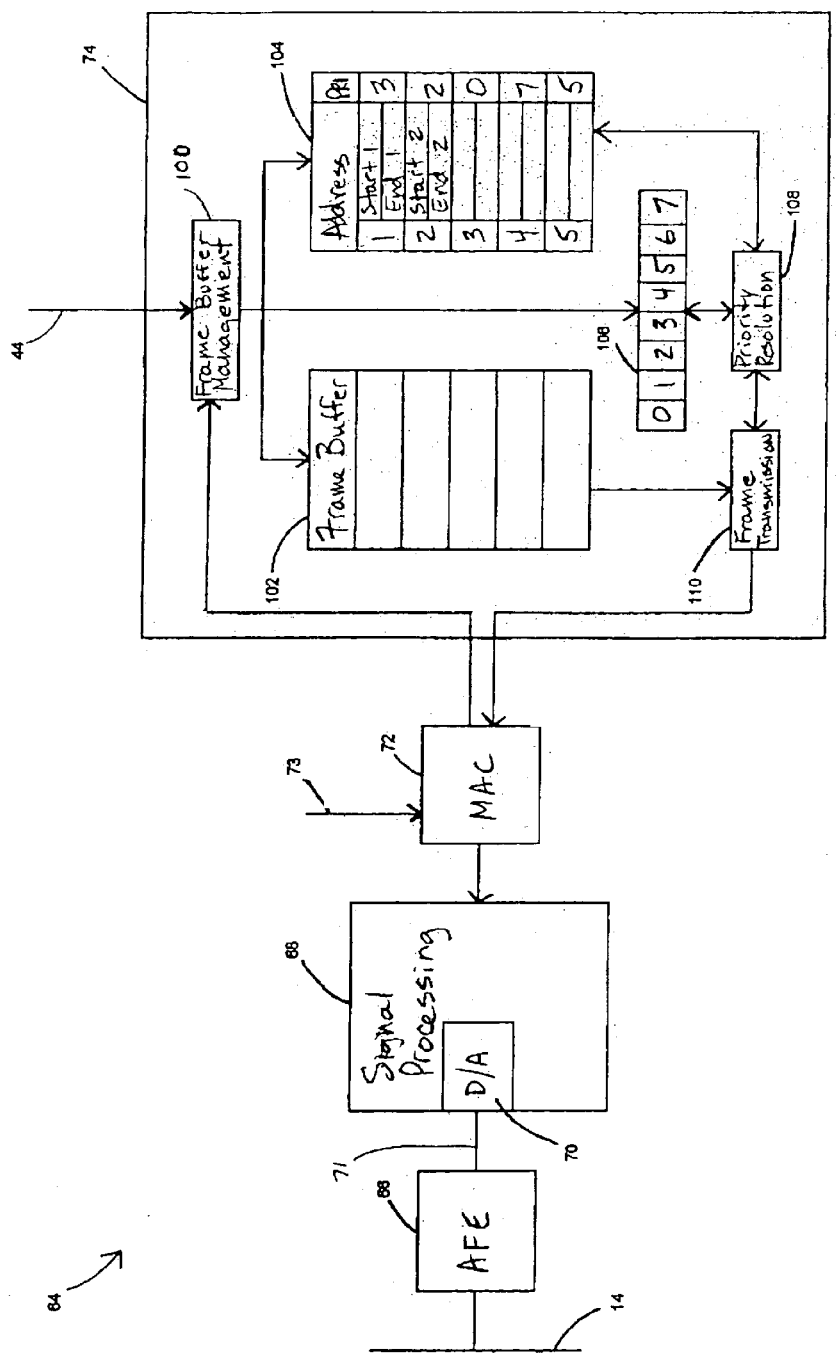
FIG. 3 is a block diagram of a network transmitter circuit in accordance with one embodiment of this invention.

Referring to FIG. 3, a block diagram of a transmitter circuit 64 which is useful in implementing the network interface card 62 (FIG. 2) is shown. Transmitter circuit 64 determines a priority order of frames for transmission and transmits data frames in such priority order. Transmitter circuit 64 includes a frame processing unit 74 that receives real time data frames and non-real time data frames from peripheral bus 44. Frame processing unit 74 includes a frame buffer management circuit 100 to manage data frames, a random access memory frame buffer 102 for storing incoming data frames, and a priority and address random access memory pointer table 104 to reference data frames. Frame processing unit 74 also includes a register 106 for storing an indicator representing the priority of frames available for transmission, a priority resolution circuit 108 for selecting the highest priority data frame available for transmission (or the priority data frame requested by the media access controller), and a frame transmission circuit 110 for retrieving data frames from the frame buffer 102 and transmitting data frames to the media access controller 72.

In operation, the frame buffer management circuit 100 will function to read incoming data frames received from peripheral bus 44 and to write the data frames to the random access memory frame buffer 102. Further, the frame buffer management circuit 100 writes, to the pointer table 104, the start address and end address corresponding to where the data frame was stored in the frame buffer 102 along with the corresponding priority level. The frame buffer management circuit 100 also sets a bit in the register 106 corresponding to the priority level.

In operation, the priority resolution circuit 108 will function to read the register 106 to determine the highest priority data frame available for transmission, to retrieve the frame's address from the random access memory pointer table 104, and to send the data frame's address to the frame transmission circuit 110. Further, after a frame has been transmitted, the priority resolution circuit clears the random access memory pointer table 104 and, if appropriate, the indicator in the register 106.

In operation, the frame transmission circuit 110 will function to retrieve the data frame from the random access memory frame buffer 102 and to present the data frame to a media access controller 72. Generally real time data frames will have a high priority level indicator while non-real time data frames will have a low priority indicator. A more detailed discussion of the operation of processing unit 74 is included later herein with respect to FIGS. 4a and 4b.

In operation, the media access controller 72 is coupled to a physical layer circuit 68. The physical layer circuit 68 includes digital signal processing circuits for payload encoding bits of data within the transmission data frame and generating a digitized modulated carrier representing the transmission data frame. A digital to analog converter 70 generates an analog carrier signal on line 71. An analog front end 66 couples the analog carrier signal on line 71 to the network medium 14 and includes appropriate amplifier circuits for assuring that the strength of the signal is within the parameters of the network transmission protocol.

In operation, the media access controller 72 receives a signal from channel sensor circuitry (not shown) on line 73 indicating that the network medium 14 is available for transmission. Upon receipt of such signal, the media access controller 72 generates a data frame request to the frame transmission circuit 110. Generally, the frame transmission circuit 110 provides the highest priority data frame stored in the random access memory frame buffer 102 to the media access controller 72 for transmission. However, it is contemplated that in certain environments, the media access controller 72 may request a specific priority frame that is less than the highest priority frame. In such environment, the frame transmission circuit 110 will provide the requested priority framed to the media access controller 72.

Figure 4C:
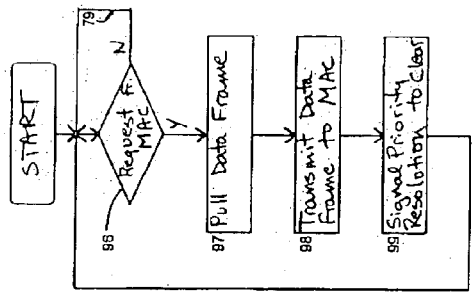
FIG. 4c is a flow chart showing exemplary operation of the of the frame transmission circuit in accordance with one embodiment of this invention.
Figure 4B:
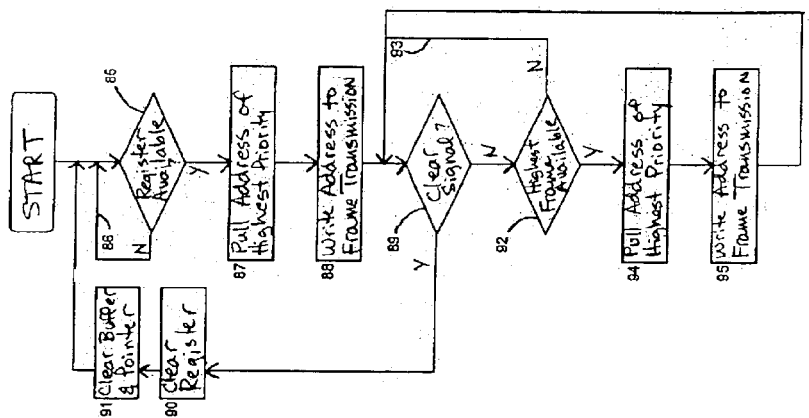
FIG. 4b is a flow chart showing exemplary operation of a priority resolution circuit in accordance with one embodiment of this invention.
Figure 4A:
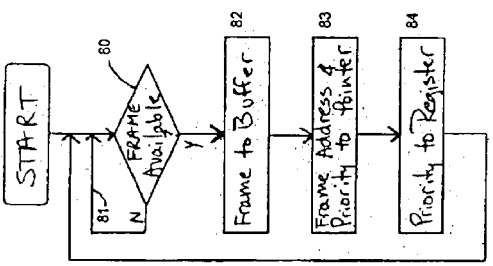
FIG. 4a is a flow chart showing exemplary operation of a frame buffer management circuit in accordance with one embodiment of this invention.

FIGS. 4a, 4b, 4c each show a flowchart representing operation of a circuit within the frame processing unit 74. Referring specifically to the flowchart of FIG. 4a, in conjunction with the block diagram of FIG. 3, the operation of the frame buffer management circuit 100 is shown.

At step 80, the frame buffer management circuit 100 monitors the peripheral bus 44 to determine whether a data frame is present for transmission. If a data frame is not available, as indicated by return loop 81, the frame buffer management circuit 100 waits until a data frame is available from the peripheral bus 44. At step 82, if a data frame is present on the peripheral bus 44, the frame buffer management circuit 100 writes the data to the random access memory frame buffer 102. At step 83, the frame buffer management circuit 100 writes the data frame's address and the frame's priority level to the random access memory pointer table 104. And, at step 84, the frame buffer management circuit 100 sets a bit in the register 106 corresponding to the data frame's priority level in the random access memory pointer table 104.

Referring to FIG. 4b, in conjunction with FIG. 3, the operation of the priority resolution circuit 108 is shown. At step 85, the priority resolution circuit 108 reads the register 106 for available data frames. If there is no data frame available, as indicated by return loop 86, the priority resolution circuit 108 rereads the register 106 until a data frame is available. At step 87, if a data frame is available, the priority resolution circuit 108 retrieves the address of the highest priority data frame (or the priority requested by the media access controller) from the random access memory pointer table 104. At step 88, the priority resolution circuit 108 writes the data frame's address to the frame transmission circuit 110.

At step 89, the priority resolution circuit 108 waits for a signal from the frame transmission circuit 110 to clear the register 106 and the random access memory frame buffer 102 and the random access memory pointer table 104. At step 90, if the priority resolution circuit 108 receives a signal to clear the register 106 from the frame transmission circuit 110, the priority resolution circuit 108 clears the register 106. At step 91, the priority resolution circuit 108 clears the random access memory frame buffer 102 and the random access memory pointer table 104. If at step 89, the priority resolution circuit 108 does not receive a signal from frame transmission circuit to clear the register 106, the priority resolution circuit 108 rereads the register 106 for determining whether a higher priority data frame (or a frame with the priority requested by the media access controller) is available as represented by step 92. If there is no such frame, as indicated by return loop 93, the priority resolution circuit 108 again waits for a signal from the frame transmission circuit 110 to clear the register 106 (step 89). At step 94, if there is such a data frame available, the priority resolution circuit 108 retrieves the address of such data frame from the random access memory pointer table 104. At step 95, the priority resolution circuit 108 writes the data frame's address to the frame transmission circuit 110.

It should be appreciated that steps 89 and 92 operate to assure that any address written to the frame transmission circuit 110 can be overwritten with an address of a higher priority frame (or by a frame of the requested priority) at any time prior to the priority resolution circuit 108 receiving the clear signal at step 89.

Referring to FIG. 4c, in conjunction with FIG. 3, the operation of the frame transmission circuit 110 is shown. At step 96, the frame transmission circuit 110 waits for a request from the media access controller 72 for transmitting the data frame. If the frame transmission circuit 110 does not receive a request from the media access controller 72, as indicated by return loop 79, the frame transmission circuit 110 merely waits for a request from the media access controller 72. At step 97, when the frame transmission circuit 110 receives a request from the media access controller 72, the frame transmission circuit 110 retrieves the data frame from the random access memory frame buffer 102. At step 98, the frame transmission circuit 110 transmits the data frame to the media access controller 72. And, at step 99, the frame transmission circuit sends a signal to the priority resolution circuit 108 to clear the register 106 and the random access memory frame buffer 102 and the random access memory pointer table 104.

Figure 5:
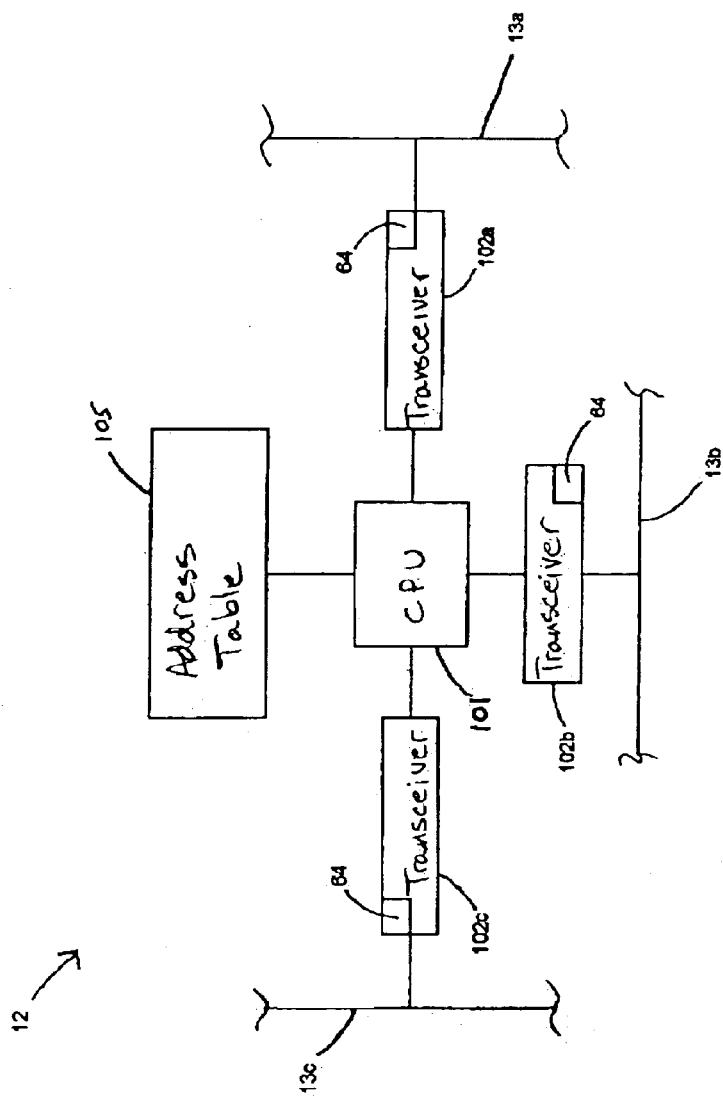
FIG. 5 is a block diagram of a router in accordance with one embodiment of this invention.

Referring to FIG. 5, a block diagram of router 12 is shown in accordance with this invention. Router 12 includes a microprocessor 101 controlling operation of the router. A plurality of transceivers 102(a)–102(c) each couple router 12 to one of the plurality of sub networks 13. The processor 101 is linked to an address table 105 and operates to route frames received by one transceiver 102(a)–102(c) on one sub network 13(a)–13(c) onto another one of the sub networks 13(a)–13(c) on which the device to which the frame is addressed is located. Each transceiver 102(a)–102(c) includes a transmitter circuit 64 that is structured and functions as described earlier with respect to FIGS. 3, 4a, and 4b. Such structure and function assures that router 12 functions to transmit real time frames on the sub networks prior to non-real time frames.

The above described systems and methods provide a frame buffer for the prioritization of real time data frames for transmission over a network medium. Such prioritization may be independent of any prioritization scheme, if any, implemented in a media access controller.

The preferred prioritization scheme provides for eight priority levels, which can be represented by a three bit priority indicator. However, it should be appreciated that additional priority levels can be assigned to each frame by scaling the teaching of this preferred embodiment. A system with multiple priority levels becomes useful for prioritizing between real time audio data and real time video data for example. Such a system also enables prioritization between different digitized audio data frames to provide a higher priority for frames that contain more critical speech sounds. For example, frames that contain vowel sounds critical for operators understanding a phrase of speech may be prioritized over frames containing hard consonant sounds which, if dropped, may not render the speech completely unintelligible.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A frame processing unit for transmitting data frames of varying priorities on a network medium comprising:

a) a frame buffer management circuit receiving data frames and storing data frames in a buffer memory;

b) a register storing data representing the existence of data frames of a designated priority in the buffer memory;

c) a priority resolution circuit, reading the register to determine a highest priority data frame available for transmission; and d) a frame transmission circuit receiving an address of the highest priority data frame from the priority resolution circuit, receiving a signal from a media access controller indicating that the data frame may be transmitted, retrieving the data frame from the buffer memory corresponding to the address, and making the data frame available to the media access controller for transmitting to the network medium, wherein the priority resolution circuit continually retrieves data from the register to determine a highest priority data frame in the buffer memory and replaces the address previously provided to the frame transmission circuit if a higher priority frame becomes available.

2. The frame processing unit of claim 1, wherein the frame buffer is a random access memory frame buffer.

3. The frame processing unit of claim 2, further including a random access memory pointer table storing an indicator of the priority for each frame in the frame buffer along with an address location of each frame in the frame buffer.

4. The frame processing unit of claim 3, wherein the frame buffer management circuit locates the address of the highest priority frame, as indicated by the register, from the random access memory pointer table.

5. The frame processing unit of claim 4, wherein the media access controller receives the frame from the frame transmission circuit and makes each frame available to physical layer circuitry.

6. The frame processing unit of claim 5, wherein the frame transmission frame circuit, upon transmission of the data frame to the media access controller, sends a command to the priority resolution circuit which in turn updates the register and the random access memory pointer table to reflect transmission of the data frame.

7. The frame processing unit of claim 6, wherein the frame buffer management circuit receives and stores data frames from an application via a peripheral bus.

8. The frame processing unit of claim 7, wherein data received via the peripheral bus may include data of varying priorities as assigned by the application.

9. A method of transmitting a highest priority data frame available for transmission in a frame buffer, the method comprising:

a) reading data from a register to determine a priority of the highest priority data frame available for transmission;

b) locating an address at which the highest priority frame is stored in a frame buffer;

c) writing the address of the highest priority data frame to a frame transmission circuit;

d) overwriting the address of the highest priority data frame with an address of a new highest priority data frame if a new higher yet priority data frame becomes available; and e) retrieving the new highest priority data frame from the frame buffer and transmitting the new highest priority data frame when the network media is available.

10. The method of claim 9, further including updating the register upon transmission of the data frame to reflect transmission of the data frame.

11. The method of claim 10, wherein the step of locating the frame buffer address includes looking up the frame buffer address in a pointer table which stores the frame buffer address along with the priority of the frame stored at the address.

12. The method of claim 11, further including updating the pointer table upon transmission of a data frame to reflect transmission of the data frame.

13. A network computer comprising:

a) a central processing unit operating a plurality of applications generating data frames of varying priorities for transmission on a network medium;

b) a network interface circuit receiving the data frames and transmitting the data frames on the network medium in priority order, the network interface circuit including:

i) a frame buffer management circuit receiving data frames from the central processing unit and storing data frames in a buffer memory;

ii) a register storing data representing the existence of data frames of a designated priority in the buffer memory;

iii) a priority resolution circuit, reading the register to determine a highest priority data frame available for transmission; and iii) a frame transmission circuit receiving an address of the highest priority data frame from the priority resolution circuit, receiving a signal from a media access controller indicating that the data frame may be transmitted, retrieving the data frame from the buffer memory corresponding to the address, and making the data frame available to the media access controller for transmitting to the network medium, wherein the priority resolution circuit continually retrieves data from the register to determine highest priority data frame in the buffer memory and replaces an address previously provided to the frame transmission circuit if a higher priority frame becomes available.

14. The network computer of claim 13, wherein the frame buffer is a random access memory frame buffer.

15. The network computer of claim 14, further including a pointer table storing an indicator of the priority for each frame in the frame buffer along with an address location of each frame in the fame buffer.

16. The network computer of claim 15, wherein the frame buffer management circuit locates the address of the highest priority frame, as indicated by the register, from the random access memory pointer table.

17. The network computer of claim 16, wherein the media access controller receives the frame from the frame transmission circuit and makes each frame available to physical layer circuitry.

18. The network computer of claim 17, wherein the frame transmission circuit, upon transmission of the data frame to the media access controller, sends a command to the priority resolution circuit which in turn updates the register and the random access memory pointer table to reflect transmission of the data frame.

19. The network computer of claim 18, wherein the frame buffer management circuit frames from an application via a peripheral bus.

20. The network computer of claim 19, wherein data received via the peripheral bus may include data of varying priorities as assigned by the application.

* * * * *

UNITED STATES PATENT AND TRADEMARK OFFICE
CERTIFICATE OF CORRECTION

PATENT NO. : 6,862,630 B1
DATED : March 1, 2005
INVENTOR(S) : Garg et al.

It is certified that error appears in the above-identified patent and that said Letters Patent is hereby corrected as shown below:

Column 10,
Line 2, replace "management circuit frames" with -- management circuit receives and stores data frames --

Signed and Sealed this

Twenty-fourth Day of May, 2005

JON W. DUDAS
*Director of the United States Patent and Trademark Office*